(12) United States Patent
Lund

(10) Patent No.: US 6,640,746 B1
(45) Date of Patent: Nov. 4, 2003

(54) SQUIRREL/RACCOON DETERRENT FOR BIRD FEEDER

(76) Inventor: Roderick I. Lund, 7124 Coachwood Cir., Woodbury, MN (US) 55125

( * ) Notice: Subject to any disclaimer, the term of this patent is extended or adjusted under 35 U.S.C. 154(b) by 0 days.

(21) Appl. No.: 10/233,872

(22) Filed: Aug. 29, 2002

Related U.S. Application Data

(60) Provisional application No. 60/326,396, filed on Oct. 2, 2001.

(51) Int. Cl.[7] .......................... A01K 39/01; A01K 1/10
(52) U.S. Cl. ........................ 119/57.9; 119/59
(58) Field of Search .................. 119/52.3, 57.9, 119/59; D30/124

(56) References Cited

U.S. PATENT DOCUMENTS

| | | |
|---|---|---|
| 4,031,856 A | 6/1977 | Chester |
| 4,646,686 A | 3/1987 | Furlani |
| 4,767,088 A * | 8/1988 | Fielder et al. ............. 119/57.9 |
| RE32,970 E | 7/1989 | Furlani |
| 5,156,112 A | 10/1992 | Brown |
| 5,163,382 A | 11/1992 | Morrison |
| 5,195,459 A | 3/1993 | Ancketill |
| 5,285,748 A | 2/1994 | Weldin |
| 5,295,455 A * | 3/1994 | Johnson ..................... 119/57.9 |
| 5,355,835 A | 10/1994 | Freed |
| 5,375,558 A | 12/1994 | Drakos |
| 5,394,641 A | 3/1995 | Danca |
| 5,445,109 A | 8/1995 | Gray et al. |
| 5,720,238 A | 2/1998 | Drakos |
| 5,826,540 A | 10/1998 | Bridges |
| 5,878,537 A | 3/1999 | Flischel |
| 5,964,183 A | 10/1999 | Czipri |
| 6,024,048 A | 2/2000 | Potente |
| 6,192,832 B1 | 2/2001 | Husnik |
| 6,269,771 B1 * | 8/2001 | Cotter ...................... 119/57.9 |
| 6,532,894 B2 * | 3/2003 | Johnson ..................... 119/52.3 |

* cited by examiner

*Primary Examiner*—Charles T. Jordan
*Assistant Examiner*—Elizabeth Shaw
(74) *Attorney, Agent, or Firm*—Tipton L. Randall

(57) ABSTRACT

The invention is a squirrel deterrent assembly including a pole member supporting a bird feeding device. A biasing spring member having first and second ends encircles a portion of the pole member and is secured thereto at the first end thereof. An axially elongated sleeve member surrounds the spring member and the portion of the pole member, with the sleeve member secured to the spring member at the second end thereof. A squirrel grasping the sleeve member causes up and down movement thereof, relative to the pole member, thereby frightening the animal off the assembly.

21 Claims, 7 Drawing Sheets

SQUIRREL/RACCOON DETERRENT FOR BIRD FEEDER

CROSS REFERENCE TO RELATED APPLICATION

This application claims the benefit under 35 U.S.C. §119 (e) of provisional application Serial No.60/326,396, filed Oct. 2, 2001. application Ser. No. 60/326,396 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

1. Field of the Invention

The invention relates to a device for deterring squirrels and similar animals from accessing a bird feeder and, more particularly, a device that attaches to a support for the bird feeder.

2. Background of the Invention

Bird feeders are typically invaded by squirrels, raccoons, cats and other marauding animals which climb up the pole that supports the feeder above the ground and steal the feed. Despite many attempts to devise a feeder, either pole-mounted or of the hanging type, that is resistant to being looted by these animals, no consistently effective product exists. Some examples of devices for deterring marauding animals from bird feeders for which patents have been granted include the following.

Chester, in U.S. Pat. No. 4,031,856, describes a post for supporting a bird platform such as a bird feeder or bird house that includes an axially elongated sleeve slidable on the post. A mechanism is provided to bias the sleeve toward the top of the post with a counterweight inside the post which is connected to the sleeve by a line which passes over a pulley at the top of the post. A squirrel climbing the post onto the sleeve causes the sleeve to descend, thereby causing the squirrel to jump off the post. The sleeve then returns to the original position by the pull of the counterweight.

In U.S. Pat. No. 4,646,686, and Re.32,970, Furlani discloses a cylindrical, transparent feed container located inside a concentric, coaxial transparent shroud. The shroud is supported on the container by a spring for movement between a bird feeding position and a position in which heavier birds or animals cause the shroud to block access to the feed. Perches are supported on the shroud adjacent the access openings in the shroud container.

Brown, in U.S. Pat. No. 5,156,112, describes a bird feeder having a metal feed container located inside a concentric, coaxial, metal shroud cover that rotates. The rotation allows access to the feed only about half of the time. For heavier animals, the cover shroud moves downward over the feed container, blocking access to the feed container.

U.S. Pat. No. 5,163,386 by Morrison discloses a bird feeder that prevents squirrels from access to food within the feeder. The feeder includes a first housing and a second housing, with the housings having alignable holes for feeding. The weight of the squirrel causes the housings to move so the holes are nonaligned, preventing the squirrel from accessing the food.

Ancketill, in U.S. Pat. No. 5,195,459, describes a bird feeder having a shroud biased away from a food holder by a spring. When a squirrel lands on the shroud, the weight of the animal cause the shroud to descend over the food holder thereby preventing the animal from gaining access to the food.

In U.S. Pat. No. 5,285,748, Weldin describes a bird feeder apparatus that includes an elongated tubular housing having a floor mounted between the first and second ends of the tubular housing, with the support post secured to the floor within the tubular housing. The housing has an exterior annular ring extending there around at the floor level with feed slots just above the ring. A two piece annular sleeve is secured within the housing with a spring between the two pieces, with one sleeve piece extending beyond the housing.

Freed, in U.S. Pat. No. 5,355,835, describes a bird feeder pole and platform assembly for deterring animal access to the feeder. The platform slides up and down the pole on roller guides with counter weights inside the pole holding it up. When an animal lands on the platform, the added weight causes the platform to descend the pole, frightening the animal away.

U.S. Pat. Nos. 5,375,558 and 5,720,238 by Drakos discloses a suspended bird feeder that has inner and outer housings with the inner housing fixed vertically and the outer housing telescopically positioned thereabout and moveable between upper and lower positions. The outer housing is biased toward the upper, or feed available, position with springs or counterweights. The weight of an animal sitting on the outer housing causes the housing to move to the lower, or feed unavailable, position thereby preventing the animal access to the food.

Danca, in U.S. Pat. No. 5,394,641, describes a bird feeder having an animal blockage device that includes a series of concentric casings moveably surrounding a support pole for the feeder. The casings prevent squirrels or other animals from traveling up the support pole to the feeder.

In U.S. Pat. No. 5,445,109, Gray et al. describe a selective bird feeder that includes a container with a spring biased cover having several feeding perches. Larger birds landing on the cover perches cause the cover to close on the container, thereby preventing larger birds access to the feed in the container.

Bridges, in U.S. Pat. No. 5,826,540, describes a bird feeder having inner and outer cylinders with alignable holes therein. The cylinders have a biasing spring to hold the feeding holes in alignment. A squirrel alighting on the feeder moves the outer cylinder relative to the inner one against the biasing spring causing misalignment of the feeding holes, thus preventing the squirrel access to the feed in the inner cylinder.

In U.S. Pat. No. 5,878,537, Flischel describes a squirrel-proof post having one or more concentric sleeves suspended from a platform at the top of the post by sets of springs. The sleeve moves down the post when a squirrel lands on it, thereby causing the squirrel to jump off. The spring then returns the sleeve to the original position.

Czipri, in U.S. Pat. No. 5,964,183, describes a bird feeder that includes a first inner housing and a second outer housing, with the housings having alignable holes for feeding. The weight of a squirrel on a lever pivotally connected to the outer housing causes the housing to move so the holes are nonaligned, preventing the squirrel from accessing the food.

In U.S. Pat. No. 6,024,048, Potente describes a flexible sheet of material formed into a cylindrical shape acquiring an internal spring tension. The sheet placed as a sleeve over a pole or post serves to dislodge climbing animals by compressing along its length and, in turn, receiving an equal and opposite force of an instant recoil to frighten the animal away.

Husnik, in U.S. Pat. No. 6,192,832, describes a bird feeder that has an internal feed container with access holes and a rotatable shell that can cover the access holes. The rotatable shell is counter weighted so that birds do not rotate the shell while squirrels, heavier than birds, rotate the shell to close off the feed access holes. The device is preferably mounted horizontally with supports on each end of the feeder.

Applicant has invented an assembly with minimum moving parts for deterring marauding animals from accessing a bird feeder. Other features and advantages of the present invention will become apparent from the following description of the animal deterrent assembly.

SUMMARY OF THE INVENTION

The invention is a terrestrial animal deterrent assembly for a bird feeding device, including a vertical pole member adapted for supporting the bird feeding device. A biasing spring member of a selected length, having first and second end portions, encircles a portion of the pole member and is secured thereto at the spring member first end portion. An axially elongated sleeve member of a length greater than the biasing spring member surrounds and encloses the spring member and the portion of the pole member. The sleeve member is secured to the spring member at the spring member second end portion. A terrestrial animal grasping the biased sleeve member causes up and down movement thereof, relative to the pole member, thereby frightening the terrestrial animal off the assembly.

DESCRIPTION OF THE PREFERRED EMBODIMENTS

Nomenclature

Figure 1:
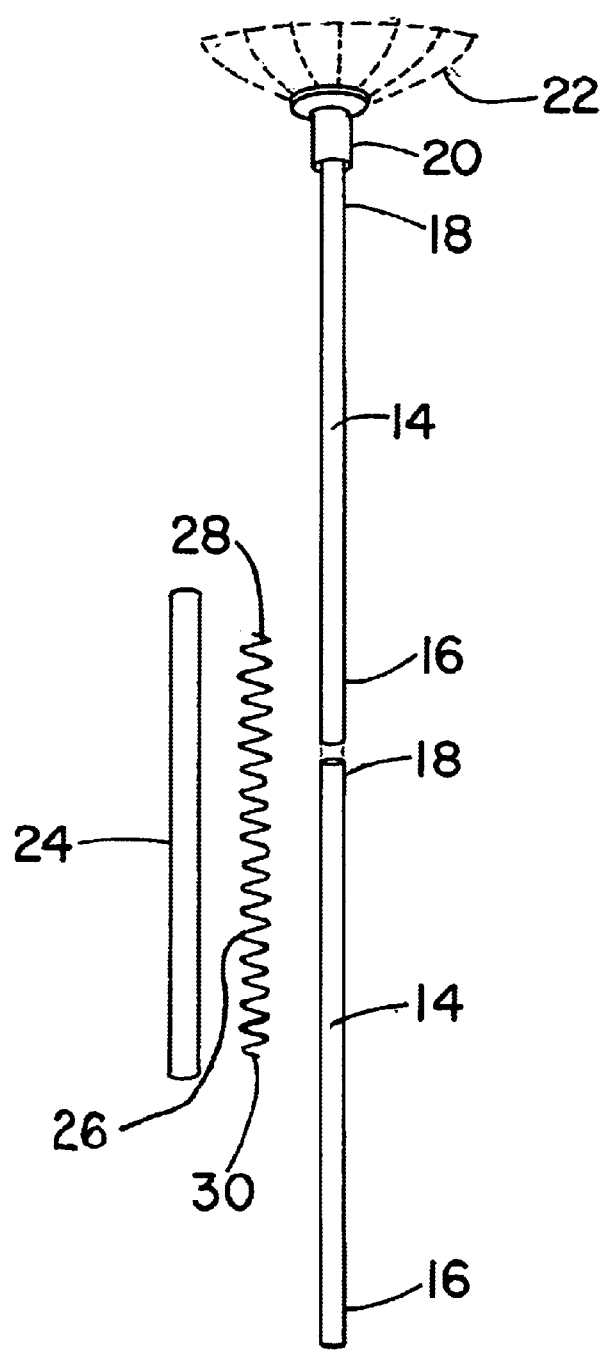
FIG. 1 is a perspective view of the separate components of the animal deterrent assembly of the present invention.

10 Animal Deterrent Assembly
12 Pole Member
14 Pole Sections
16 First End of Pole Section
18 Second End of Pole Section
20 Support Bracket Member
22 Feeding Device
24 Axially Elongated Sleeve Member
26 Biasing Spring Member
28 First End Portion of Spring Member
30 Second End Portion of Spring Member
32 First End of Spring Member
34 Second End of Spring Member
36 Side aperture in Pole Member
38 Lances or Half Shears
40 Side aperture in Sleeve Member
42 Loop at Spring Second End Construction Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The term "animal" as used herein is intended to be broad enough to apply to any rodent, varment, or marauding animal, such as cats, and especially squirrels, which are inclined to climb the post, pole or other support of a bird platform. The squirrel is the commonest example of such a marauder.

The assembly of the present invention is useful for protecting any elevated bird platform, such as the bird feeder device 22 illustrated in the drawings. It may also be used to protect a bird house or similar structure in an elevated location.

The animal deterrent assembly 10 of the present invention is shown in FIGS. 1–4. The pole member 12 may be solid or tubular and may be of unitary construction or composed of interconnected pieces. Although the pole member 12 is shown as being cylindrical, the pole member 12 may have a triangular, square or polyhedral cross section with equivalent results. The pole member 12 is preferably cylindrical, with a circular cross section, based upon the wide availability of such pole member material. The pole member 12 is preferably fabricated out of metal pipe or tube and may have a hollow interior. Aluminum tubing is a suitable material, but other metals or materials may be used with equal results. The pole member 12 is preferably constructed of a plurality of sections 14, each having a first end 16 and a second end 18. The sections 14 are of approximately equal length and of uniform diameter except at one end 18 where the diameter is reduced sufficiently for the second end 18 of one section to fit into the first end 16 of another section. This structural feature allows formation of a longer pole member 12 from multiple sections 14, while allowing for easy shipping and storage of the sections 14 in an unassembled state, as illustrated in FIG. 1. The assembled pole member 12 is mounted vertically by inserting the pole end, terminating with a section first end 16, into a pilot hole or similar opening in the ground. The opposite pole end holds a support bracket member 20 for supporting a feeding device 22 or similar structure, which may be of any desired design, again as illustrated in FIG. 1.

Figure 2:
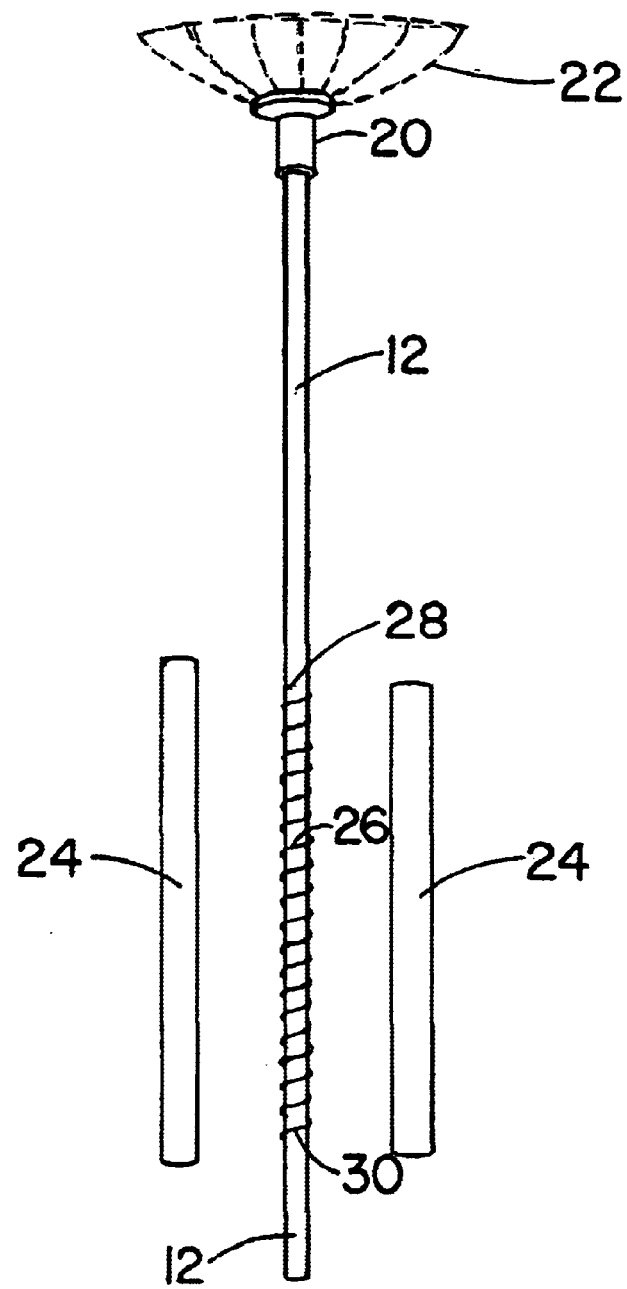
FIG. 2 is a perspective view of the spring member secured to the pole member and two sleeve members of alternative material of the assembly of the present invention.
Figure 5:
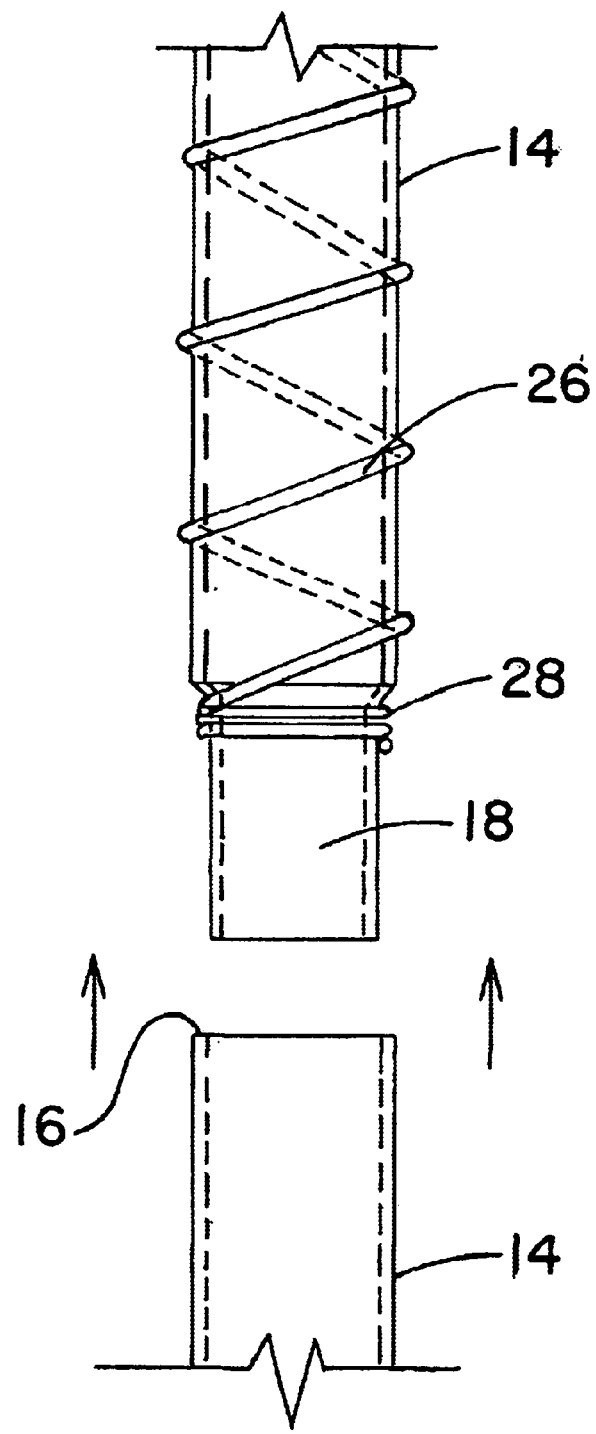
FIG. 5 is a perspective view of one embodiment for securing the spring member to the pole member.
Figure 6:
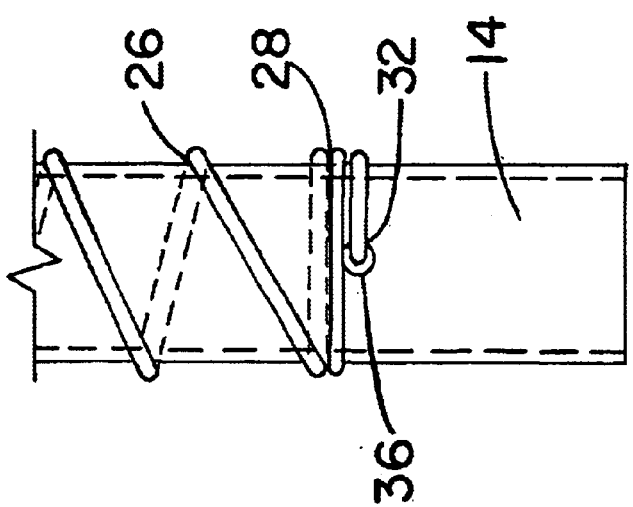
FIG. 6 is a perspective view of another embodiment for securing the spring member to the pole member.

An axial elongated sleeve member 24, having a diameter larger than that of the pole sections 14, surrounds a portion of the length of the pole member 12 and is moveably secured thereto by a biasing spring member 26. The spring member 26 encircles the pole member 12, with the spring member 26 having a first end portion 28 and a second end portion 30. In one embodiment, the spring member first end portion 28 is of decreased diameter so as to be secured to a selected pole section 14 adjacent the second end 18 thereof, at the point the pole section diameter increases, as shown in FIGS. 2 and 5. In an alternative embodiment shown in FIG. 6, the spring member first end portion 28 includes a spring first end 32 that extends radially inward and fits into a side aperture 36 in the pole member 12 to secure the spring member first end portion 28 thereto. Since the pole member side aperture 36 can be positioned at any location along the length of the pole member 12, this embodiment provides greater versatility in positioning the spring member 26 on the pole member 12, compared to securing the first end portion 28 at the pole connection, as shown in FIGS. 2 and 5.

Figure 3:
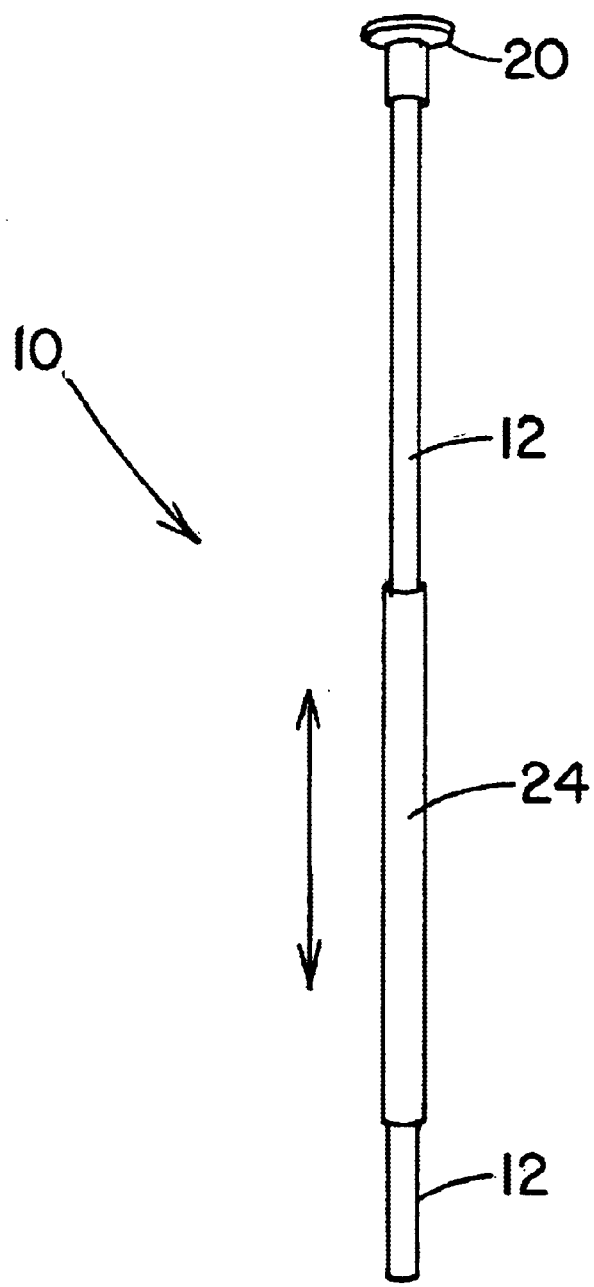
FIG. 3 is a perspective view of one embodiment of the fully assembled animal deterrent assembly of the present invention.
Figure 4:
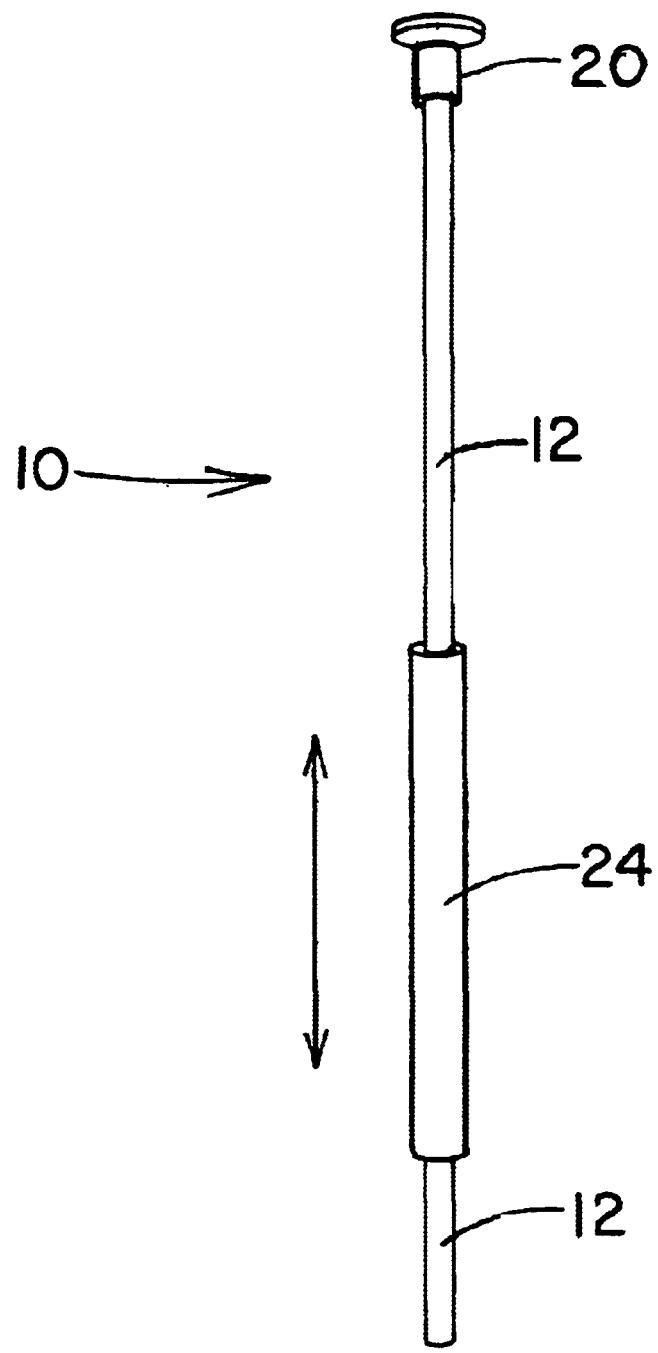
FIG. 4 is a perspective view of another embodiment of the fully assembled animal deterrent assembly of the present invention.
Figure 8:
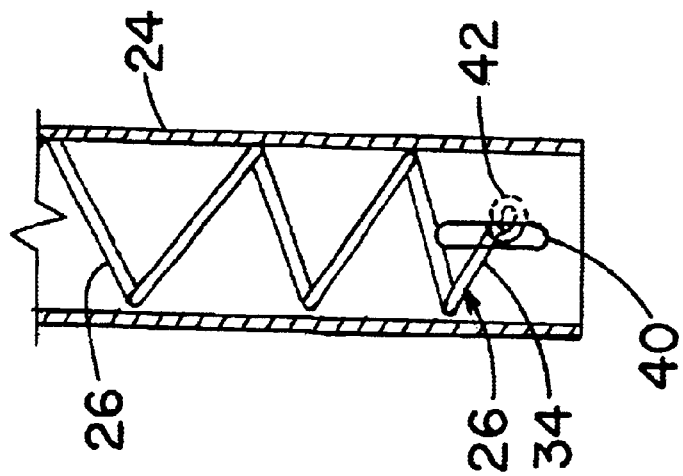
FIG. 8 is a partial sectional view of another embodiment for securing the spring member to the sleeve member.
Figure 7:
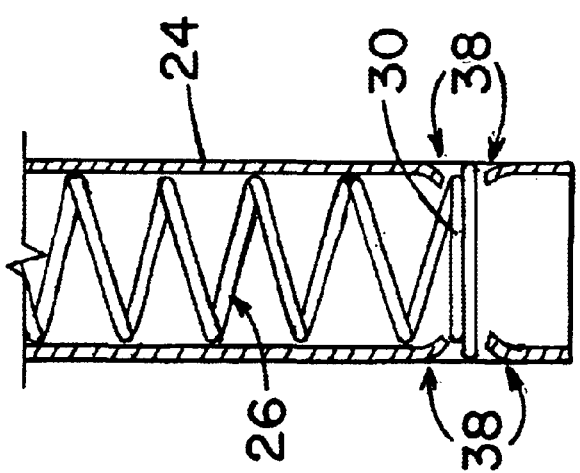
FIG. 7 is a partial sectional view of one embodiment for securing the spring member to the sleeve member.
Figure 9:
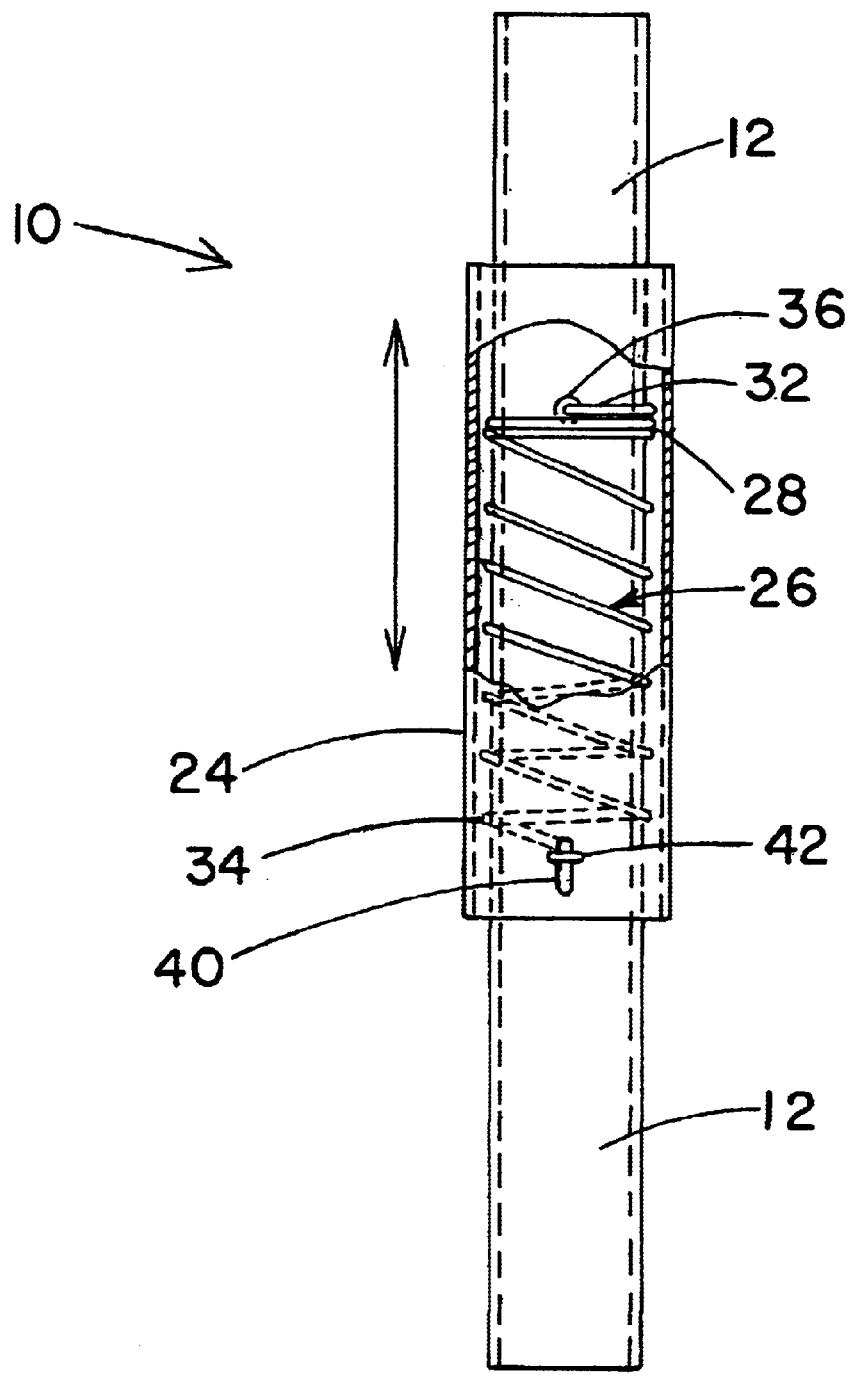
FIG. 9 is a perspective view with a partial section of one embodiment of the assembled animal deterrent assembly of the present invention.

The spring member second end portion 30 is secured to the sleeve member 24 adjacent one end thereof, with the sleeve member 24 covering the spring member 26, as shown in FIGS. 3 and 4. In one embodiment, the spring member second end portion 30 is secured to the sleeve member 24 by capturing the second end portion 30 between at least two opposed pairs of lances or half shears 38, as shown in FIG. 7. In a preferred, alternative embodiment shown in FIG. 8, the spring member second end portion 30 includes a spring second end 34 that extends radially outward and fits into a side aperture or slot 40 in the sleeve member 24 adjacent one end thereof. The spring second end 34 may include a loop 42 to further secure the spring second end 34 in the slot 40, as illustrated in FIG. 9.

The spring member 26 and sleeve member 24 may be secured to the pole member 12 in two configurations. In one configuration, the spring member first end portion 28 is secured to the pole member 12 at an elevation above the spring member second end portion 30, which is fastened to the sleeve member 24. Thus, the spring member 26 extends or elongates with additional weight on the sleeve member 24. In another configuration, the spring member's first end portion 28 is secure to the pole member 12 at an elevation below the spring member's second end portion 30, which is fastened to the sleeve member 24. Thus, the spring member 26 compresses with additional weight on the sleeve member 24. For a given sleeve member 24, the spring member 26 that extends or elongates is preferably of a smaller gauge than the spring member 26 that compresses.

The sleeve member 24 and spring member 26 are preferably located at about half the height of the pole member 12 or higher. Sufficient clearance is present between the sleeve member 24 and the spring member 26 so that the sleeve member 24 moves down and up with a slight change in weight on the sleeve member 24. With the pole member 12 mounted in the ground, an animal, such as a squirrel, climbing up the pole member 12 encounters the spring biased sleeve member 24. When the squirrel puts its weight on the sleeve member 24, the sleeve member 24 moves down and up quickly to frighten the squirrel off of the pole member 12. With the sleeve member 24 surrounding and covering the biasing spring member 26, which encircles the pole member 12, there is no danger that the squirrel can become entangled in the spring member 26 and be injured.

Referring again to FIG. 2, the spring member's first end 28 of decreased diameter is secured to the pole section 14, with the spring member 26 descending toward the base of the pole member 12. The sleeve member 24 surrounds and encloses the spring member 26 and is secured to the spring member's second end 30. The added weight of an animal on the sleeve member 24 causes movement by extension or stretching of the spring member 26 toward the base of the pole member 12. When the animal jumps off, the spring member 26 retracts to its original position. Alternatively, the spring member 26 may be positioned with the spring member first end portion 28 secured to the pole section 14, with the spring member 26 ascending toward the top of the pole member 12. Again, the sleeve member 24 covers the spring member 26 and is secured to the spring member's second end 30. The added weight of an animal on the sleeve member 24 causes movement by compressing the spring member 26 toward the base of the pole member 12. When the animal jumps off the spring member 24 expands to its original position. Thus, either orientation of the spring member 24 on the pole member 12 provides comparable results in causing movement of the sleeve member 24 when an animal moves on to it.

In the situation where the pole member 12 is of unitary construction, that is, a single length of pipe, tubing, or similar cylindrical support structure, the first end portion 28 of the biasing spring member 26 is secured to the pole member 12 by a suitable fastener, such as a screw or clip. The axially elongated sleeve member 24 encircles the spring member 26 and is fastened to the spring member 26 at the second end portion 30 thereof. The sleeve member 24 covers the spring member 26, as described above.

Preferably, the sleeve member 24 is fabricated from metal, similar to the material of the sections 14 of the pole member 12, as shown in FIGS. 2 and 3. Most preferably, the pole member 12 and sleeve member 24 are fabricated from aluminum tubing. Both the pole member 12 and the sleeve member 24 preferably are painted with a powder coat paint to provide a durable and aesthetically pleasing finish. The powder coat paint on the sleeve member exterior surface is very smooth and slippery to further deter animals from grasping the sleeve member 24. Alternatively, the sleeve member 24 may be fabricated from anodized aluminum tubing with equivalent results. The painted or anodized sleeve member's exterior surface may be waxed with, for example, car wax to further deter animals from grasping the sleeve member 24.

Alternatively, the sleeve member 24 is fabricated from a polymeric resin or plastic material for durability, light weight and economy, as shown in FIGS. 2 and 4. The second end portion 30 of the spring member 26 is readily fastened to one end of the sleeve member 24, when fabricated from polymeric resin or plastic material.

The most preferred configuration of the sleeve member 24 and spring member 26, secured to the pipe member 12, is shown in FIG. 9. The spring member 26 is secured to the pole member 12 with the first end 32 of the spring member 26 inserted into a side aperture 36 in the pole member 12. The second end 34 of the spring member 26 is positioned below the spring member's first end 32 and attached to the sleeve member 24 by inserting the second end 34 through a side aperture or slot 40 near one end of the sleeve member 24. The spring member's second end 34 includes a loop end 42 to assist in retaining the second end 34 in the slot 40. The pole member 12 extends upwardly from the ground, and the spring member 26 extends or expands upon downward movement of the sleeve member 24.

The animal deterrent assembly 10 may also be employed to scare off marauding animals, where the bird feeder device 22 is suspended from above by a pole member 12. The same orientation of the pole sections 14 are employed with the pole member's top end secured to a support and the pole member's bottom end fastened to the bird feeder device 22 from above. An animal, for example a squirrel, descending the pole member 12 encounters the spring biased sleeve member 24 and, by climbing down the sleeve member 24, produces the down and up movement that frightens the squirrel off the feeder.

While the invention has been particularly shown and described with reference to a preferred embodiment thereof, it will be understood by those skilled in the art that various changes in form and details may be made therein without departing from the spirit and scope of the invention.

I claim:

1. A terrestrial animal deterrent assembly for a bird feeding device comprising:
   (a) a vertical pole member adapted for supporting the bird feeding device;
   (b) a biasing spring member of a selected length having first and second end portions, the spring member encircling a portion of the pole member and secured to the pole member at said spring member first end portion;
   (c) an axially elongated sleeve member of a length greater than said biasing spring member, said sleeve member surrounding and enclosing said spring member and said portion of the pole member, the sleeve member secured to said spring member at said spring member second end portion, whereby a terrestrial animal grasping said biased sleeve member causes up and down movement thereof relative to the pole member, thereby frightening the terrestrial animal off the assembly.

2. The terrestrial animal deterrent assembly according to claim 1 wherein said spring member first end portion is secured to said pole at an elevation above said spring member second end portion secured to said sleeve member, whereby said spring member extends upon initial sleeve movement.

3. The terrestrial animal deterrent assembly according to claim 1 wherein said spring member first end portion is secured to said pole at an elevation below said spring member second end portion secured to said sleeve member, whereby said spring member compresses upon initial sleeve movement.

4. The terrestrial animal deterrent assembly according to claim 1 wherein said pole member includes a plurality of hollow sections with at least one section having an end of reduced diameter fitting into an open end of another hollow section, and the spring member includes a reduced diameter first end portion fitting over said reduced diameter end of said at least one pole section, the spring member reduced diameter first end portion retained thereon by an adjacent pole section fitting there around.

5. The terrestrial animal deterrent assembly according to claim 1 wherein said pole member is hollow with a side aperture therein, and said spring member first end portion includes an end retained within said pole member side aperture.

6. The terrestrial animal deterrent assembly according to claim 1 wherein said sleeve member includes at least one side aperture adjacent one end thereof, and said spring member second end portion includes an end retained within said sleeve member side aperture.

7. The terrestrial animal deterrent assembly according to claim 1 wherein said sleeve member includes at least two opposed pairs of lances adjacent one end thereof, the pairs of lances capturing said spring member second end portion there between.

8. The terrestrial animal deterrent assembly according to claim 1 wherein said pole member supports said bird feeding device from the ground.

9. The terrestrial animal deterrent assembly according to claim 1 wherein said pole member supports said bird feeding device from a point above the bird feeder.

10. The terrestrial animal deterrent assembly according to claim 1 wherein said sleeve member is fabricated from a metallic material.

11. The terrestrial animal deterrent assembly according to claim 1 wherein said sleeve member is fabricated from a polymeric resin material.

12. The terrestrial animal deterrent assembly according to claim 1 wherein said sleeve member includes a powder coat painted exterior surface.

13. A terrestrial animal deterrent assembly for a bird feeding device comprising:
    (a) a vertical, ground mounted, pole member adapted for supporting the bird feeding device;
    (b) a biasing spring member of a selected length having first and second end portions, the spring member encircling a portion of the pole member and secured to the pole member at said spring member first end portion at an elevation above said spring member second end portion;
    (c) an axially elongated sleeve member of a length greater than said biasing spring member, said sleeve member surrounding and enclosing said spring member and said portion of the pole member, the sleeve member secured to said spring member at said spring member second end portion, whereby a terrestrial animal grasping said biased sleeve member causes up and down movement thereof relative to the pole member, thereby frightening the terrestrial animal off the assembly.

14. The terrestrial animal deterrent assembly according to claim 13 wherein said pole member includes a plurality of hollow sections with at least one section having an end of reduced diameter fitting into an open end of another hollow section, and the spring member includes a reduced diameter first end portion fitting over said reduced diameter end of said at least one pole section, the spring member reduced diameter first end portion retained thereon by an adjacent pole section fitting there around.

15. The terrestrial animal deterrent assembly according to claim 13 wherein said pole member is hollow with a side aperture therein, and said spring member first end portion includes an end retained within said pole member side aperture.

16. The terrestrial animal deterrent assembly according to claim 13 wherein said sleeve member includes at least one side aperture adjacent one end thereof, and said spring member second end portion includes an end retained within said sleeve member side aperture.

17. The terrestrial animal deterrent assembly according to claim 13 wherein said sleeve member includes at least two opposed pairs of lances adjacent one end thereof, the pairs of lances capturing said spring member second end portion there between.

18. The terrestrial animal deterrent assembly according to claim 13 wherein said sleeve member is fabricated from a metallic material.

19. The terrestrial animal deterrent assembly according to claim 13 wherein said sleeve member is fabricated from a polymeric resin material.

20. The terrestrial animal deterrent assembly according to claim 13 wherein said sleeve member includes a powder coat painted exterior surface.

21. A terrestrial animal deterrent assembly for a bird feeding device comprising:
    (a) a vertical, ground mounted, pole member adapted for supporting the bird feeding device;
    (b) a biasing spring member of a selected length having first and second end portions, the spring member encircling a portion of the pole member and secured to the pole member at said spring member first end portion at an elevation above said spring member second end portion, the spring member first end portion including a spring end retained within a post member side aperture;

(c) an axially elongated metallic sleeve member of a length greater than said biasing spring member, said sleeve member surrounding and enclosing said spring member and said portion of the pole member, the sleeve member secured to said spring member at said spring member second end portion by a spring end secured within a side aperture adjacent one end of said sleeve member, whereby a terrestrial animal grasping said biased sleeve member causes up and down movement thereof relative to the pole member, thereby frightening the terrestrial animal off the assembly.

* * * * *